(12) United States Patent
Koma et al.

(10) Patent No.: US 6,292,247 B1
(45) Date of Patent: *Sep. 18, 2001

(54) ACTIVE-MATRIX LIQUID CRYSTAL DISPLAY

(75) Inventors: Norio Koma, Motosu-gun; Tetsuji Omura, Anpachi-gun; Kiyoshi Yoneda, Motosu-gun, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,093

(22) Filed: May 15, 2000

Related U.S. Application Data

(62) Division of application No. 09/193,666, filed on Nov. 17, 1998, now Pat. No. 6,137,558.

(30) Foreign Application Priority Data

Nov. 18, 1997 (JP) .................................................. 9-317517

(51) Int. Cl.$^7$ .............................. G02F 1/343; C09K 19/30
(52) U.S. Cl. ........................... 349/143; 349/42; 349/129; 252/299.63; 252/299.67
(58) Field of Search .................... 252/299.63, 299.67; 349/143, 129, 42; 428/1.1

(56) References Cited

U.S. PATENT DOCUMENTS

| | | | |
|---|---|---|---|
| 5,471,330 | * 11/1995 | Sarma et al. | 349/43 |
| 5,514,879 | * 5/1996 | Yamazaki et al. | 257/65 |
| 5,557,534 | * 9/1996 | Wu | 395/500.2 |
| 5,576,860 | * 11/1996 | Nakamura et al. | 349/113 |
| 5,600,155 | * 2/1997 | Wu | 257/22 |
| 5,905,548 | * 5/1999 | Shimada | 439/38 |
| 6,137,558 | * 10/2000 | Koma et al. | 349/143 |

* cited by examiner

Primary Examiner—Shean C. Wu
(74) Attorney, Agent, or Firm—Hogan & Hartson, L.L.P.

(57) ABSTRACT

On a TFT substrate, a TFT using a low-temperature poly silicon thin film as an active layer is formed and a plurality of pixel electrodes are formed over the TFT and its electrode wiring, with an interlayer insulating layer between. In a common electrode formed on an opposite substrate opposite the TFT substrate with a liquid crystal layer between, an alignment controlling window for the liquid crystal is formed at a predetermined position opposite each of the pixel electrodes. A wide viewing angle is achieved by dividing an alignment area of liquid crystal molecules in one pixel area. The liquid crystal layer is vertically aligned and can be operated at a low driving voltage obtained by a poly silicon TFT by including fluorine liquid crystal molecules having negative dielectric anisotropy and fluorine side chains in the liquid crystal.

10 Claims, 2 Drawing Sheets

ACTIVE-MATRIX LIQUID CRYSTAL DISPLAY

RELATED APPLICATION

This is a division of application Ser. No. 09/193.666 filed Nov. 17, 1998 U.S. Pat. No. 6,137,558, which application is hereby incorporated by reference in its entirety.

BACKGROUND OF THE INVENTION

1. Field of the Invention

The present invention relates to an active-matrix liquid crystal display (LCD) in which liquid crystal display is performed by driving each pixel by a thin film transistor (TFT) and, more particularly, to a liquid crystal display (LCD) using for a thin film transistor poly silicon made through a low-temperature process.

2. Description of the Prior Art

A liquid crystal display which seals in liquid crystal between a pair of substrates and applies voltage to the liquid crystal to perform a desired display has advantages of compactness, thinness, and easy reduction of power consumption. Such displays are therefore put to practical use in various office-automation, audio-visual, and portable or on-board information devices. Especially, active-matrix liquid crystal displays using thin film transistors (TFTs) as a switching device for driving each liquid crystal pixel can display higher-definition images without cross talk because liquid crystal pixels can be selectively driven.

A noncrystal silicon TFT using noncrystal (amorphous) silicon in its active layer and a poly silicon TFT using poly silicon of higher mobility in its active layer are both used in liquid crystal displays. Noncrystal silicon TFTs are often used in large-sized displays or the like because they can be formed in a wide area through a low-temperature process. On the other hand, the mobility of poly silicon is higher than that of noncrystal silicon and poly silicon can form a device by self alignment. As it is therefore easy to make the area of a TFT and a pixel with a poly silicon TFT smaller than that of a TFT and a pixel with a noncrystal silicon TFT, a poly silicon TFT is often preferred for use in high-resolution displays. Moreover, if poly silicon is used, it is easy to make a TFT CMOS structure. As a result, a display area TFT and a driver TFT for driving it can be formed on the same substrate through almost the same process.

As stated above, a poly silicon TFT has attractive characteristics and can have a driver on its substrate. Furthermore, poly silicon is known to be formed by polycrystallizing noncrystal silicon through a high-temperature (above 600° C.) process. In this case, noncrystal silicon is exposed to a high-temperature during a process, which makes it impossible to use a cheap glass substrate. A difficulty therefore arises when a poly silicon TFT is put to practical use.

Polycrystallizing technology using annealing treatment such as laser or lamp annealing has, however, been improved to the point where it is now possible to make poly silicon through the so-called low-temperature (below 600° C.) process. This method of forming a poly silicon TFT through a low-temperature makes it possible to use a cheap glass substrate and thereby reduce cost. Furthermore, this method makes it possible to form poly silicon TFTs in a wide area. As a result, poly silicon TFTs formed through a low-temperature process (hereinafter referred to as a low-temperature poly silicon TFT) have been put to practical use.

Although low-temperature poly silicon TFTs have been put to practical use, the most suitable liquid crystal materials and panel configuration for demonstrating the characteristics of a low-temperature poly silicon TFT as a liquid crystal display and for improving its characteristics have not been developed yet. As a result, materials and a configuration, for example, used in a liquid crystal display using a conventional noncrystal silicon TFT are directly adapted, which means that the resulting poly silicon TFTs are not able to fully demonstrate their unique characteristics.

SUMMARY OF THE INVENTION

In order to solve the above problem, an active-matrix liquid crystal display according to the present invention aims at suggesting suitable liquid crystal materials, panel configuration, and the like for obtaining a liquid crystal display enabling the best use of the characteristics of a low-temperature poly silicon TFT. In order to achieve the above object, the present invention has the following features.

First, an active-matrix liquid crystal display according to the present invention comprises a plurality of pixel electrodes formed like a matrix on the first substrate and TFTs formed to be connected to the corresponding pixel electrodes and their electrode wiring on that first substrate, wherein a display is performed by driving a liquid crystal layer sandwiched between the plurality of pixel electrodes formed on the first substrate and a common electrode formed on the second substrate placed opposite the first substrate, a poly silicon TFT, for example, using as an active layer a poly silicon layer formed at a low temperature (for example, below 600° C.) is used as the TFTs, the initial alignment of each liquid crystal molecule in the liquid crystal layer is controlled so that it will be nearly perpendicular to the pixel electrodes, and at least one material used in said liquid crystal layer having the molecular structure given by the below chemical formulas (1)–(6) having fluorine side chains is selected.

Liquid crystal molecules having fluorine side chains have high polarity in the direction of the side chains, their minor axes, and can operate well even at a low driving voltage achieved by a poly silicon TFT. Furthermore, high polarity in the direction of the minor axes of liquid crystal molecules means that it is easy to make their initial alignment vertical by, for example, strengthening repulsion between the liquid crystal molecules and a liquid crystal alignment layer. Moreover, even at a low driving voltage suitable for a poly silicon TFT, a liquid crystal layer shows a sufficiently high voltage-holding ratio, which prevents the liquid crystal from burning. The resulting liquid crystal display can be driven at a low voltage, which makes enables reduction of power consumption.

In accordance with another aspect of the present invention, an electrode-free portion is formed in the predetermined corresponding area opposite the pixel electrode in the common electrode on the second substrate as an alignment controlling window for controlling the alignment of the liquid crystal; and more than one area having different tilt azimuths are formed in each pixel electrode area by changing the alignment of the liquid crystal molecules from the vertical direction. The alignment controlling window can stably divide an alignment area of liquid crystal molecules allowing a display to have more than one priority viewing direction, and resulting in a greater viewing angle. It can therefore reduce the dependence of a liquid crystal display on visual angle and is advantageous for large-sized displays.

In accordance with still another aspect of the present invention, a planarizing interlayer insulating layer is formed over TFTs and their electrode wiring on the first substrate and each of a plurality of pixel electrodes is formed on the planarizing interlayer insulating layer. The pixel electrodes are formed on the planarizing interlayer insulating layer so that the unevenness of the pixel electrodes will not have a bad effect on vertical alignment of the liquid crystal molecules. Furthermore, pixel electrodes are formed on the planarizing interlayer insulating layer so that the pixel electrodes will cover at least TFT-formed areas (for example, TFTs and their electrode wiring), which prevents electric fields generated by TFTs etc. from leaking into the liquid crystal layer. Again, placing the pixel electrodes at an upper layer will make it easy to more efficiently apply voltage to the liquid crystal layer.

In accordance with still another aspect of the present invention, a liquid crystal material used for the liquid crystal layer in the active-matrix liquid crystal display has negative dielectric anisotropy and vertical alignment of the liquid crystal layer is controlled by vertical alignment layers formed over the common electrode and the pixel electrodes without a rubbing process, the alignment controlling window formed in the common electrode, and. voltage applied to each of the plurality of pixel electrodes. Even when a driving circuit consisting of a group of TFTs of almost the same design as that of the poly silicon TFT is formed on the peripheral part of the first substrate, vertical alignment of the liquid crystal layer without a rubbing process has no possibility of doing damage by a rubbing process to driver TFTs formed on the peripheral part of the first substrate. Such a feature will be preferable for a liquid crystal display using poly silicon TFTs in which drivers are built-in.

DESCRIPTION OF THE PREFERRED EMBODIMENT

Using the drawings, a preferred embodiment according to the present invention will be described below.

Figure 1:
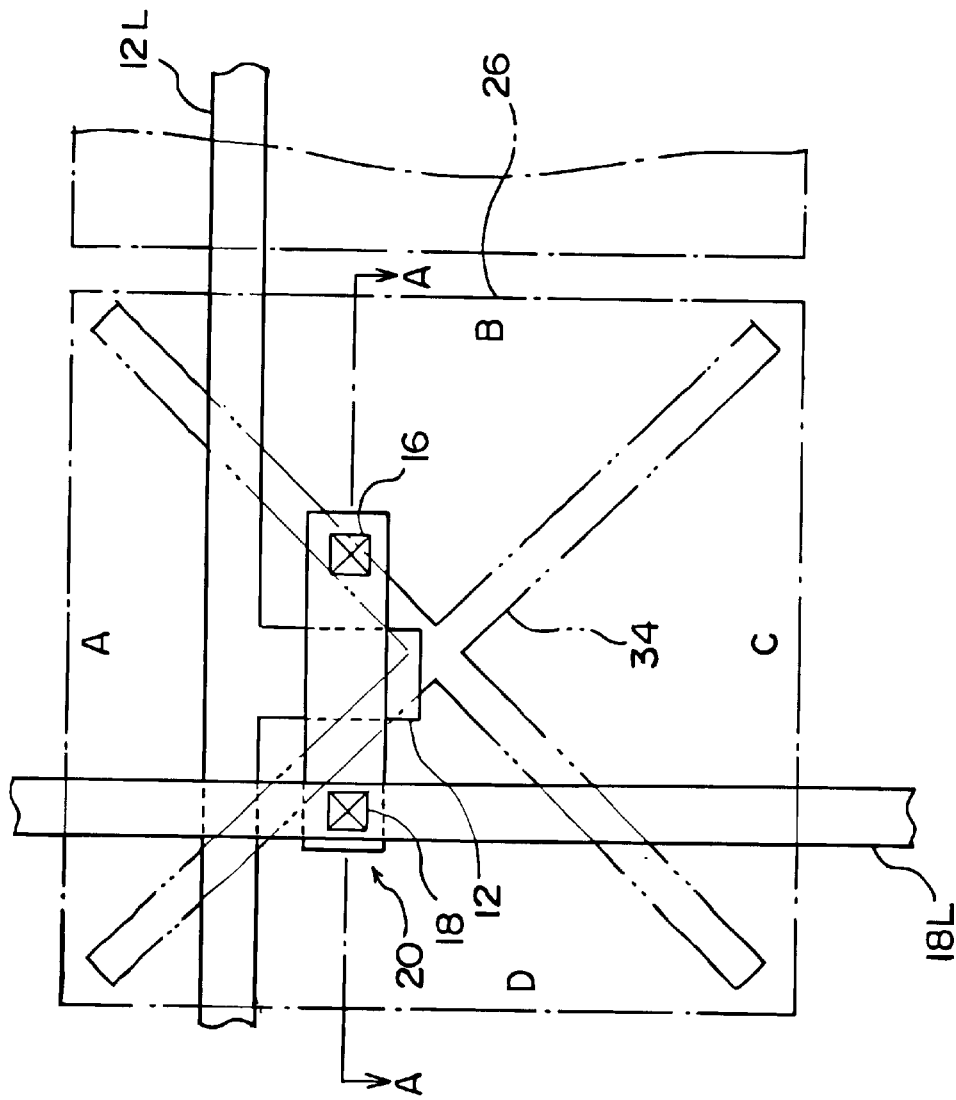
FIG. 1 is a schematic view showing an example of the plane structure of an active-matrix liquid crystal display according to the present invention.
Figure 2:
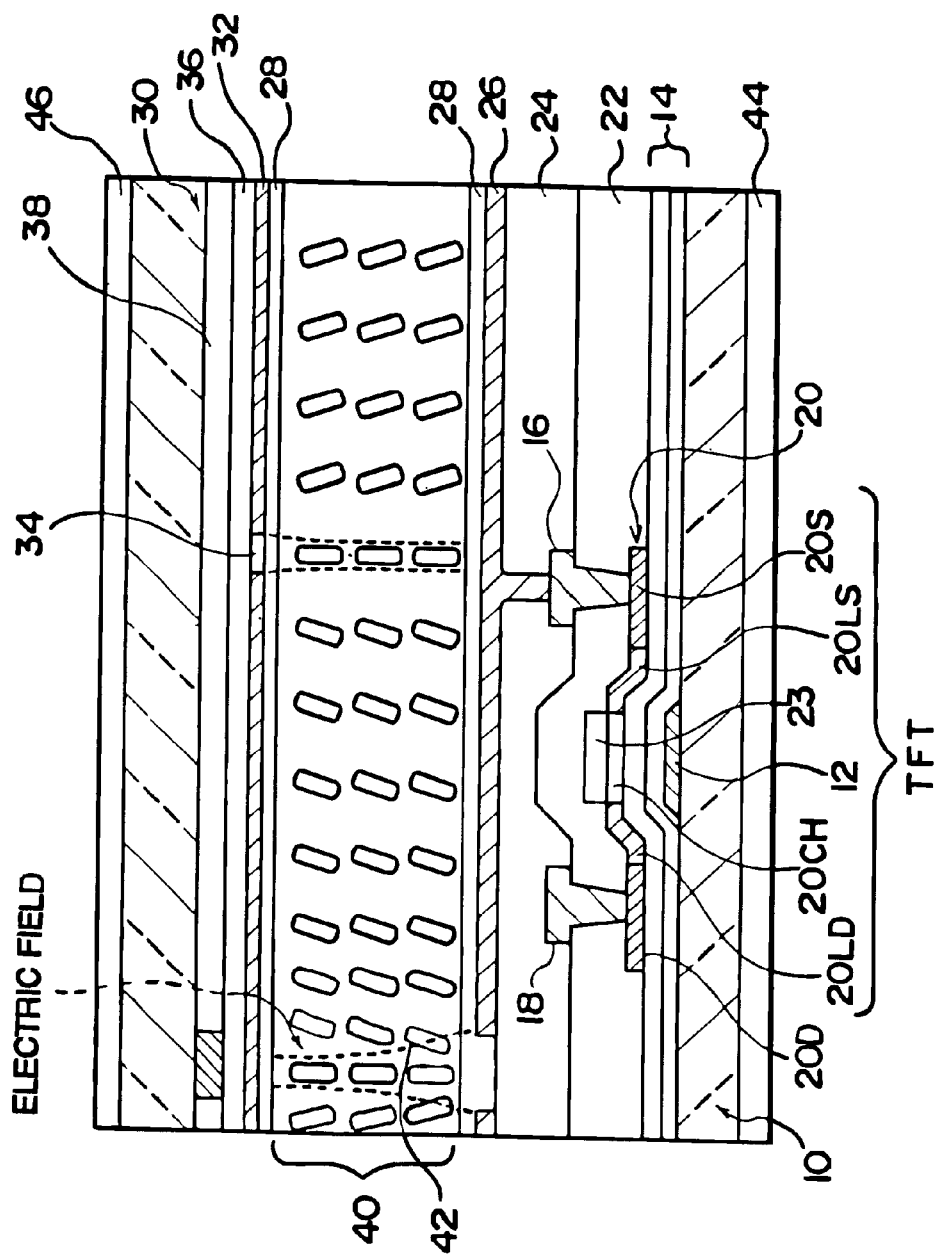
FIG. 2 is a view showing a rough section along A—A line on the liquid crystal display shown in FIG. 1.

FIG. 1 shows an example of the plane structure of one pixel in an active-matrix liquid crystal display according to the present invention; FIG. 2 shows an example of a rough section along line A—A in FIG. 1. An active-matrix liquid crystal display according to the embodiment has a TFT substrate (first substrate) 10 on which low-temperature poly silicon TFTs are formed and over which a pixel electrode 26 is located, and an opposite substrate (second substrate) 30 located opposite the TFT substrate 10 so that a liquid crystal layer 40 is held between them. On the outside of the substrates 10 and 30, polarizing plates 44 and 46 are located respectively so that the directions of their transmitted polarized light cross at right angles.

In the example of shown in FIG. 2, a gate electrode 12 made by patterning a metal such as Cr, Ta, or Mo, and gate electrode wiring 12L uniting with the gate electrode 12 are formed on the TFT substrates 10 made of glass or such material and a gate insulating layer 14, for example, of SiNx, $SiO_2$, or a lamination of both is formed over the gate electrode 12 and the gate electrode wiring 12L. A poly silicon thin film 20 serving as an active layer of a TFT is formed on the gate insulating layer 14. The poly silicon thin film 20 is obtained by performing on a noncrystal-silicon film the so-called low-temperature (below 600° C. ) annealing treatment such as laser annealing, lamp annealing, or their combination (for polycrystallizing) and then insularly patterning.

A doping stopper 23 of $SiO_2$ etc. is formed on the poly silicon thin film 20. The doping stopper 23 is patterned to form in a self-aligned manner a shape almost the same as that of the gate electrode 12 through exposure from the back of the TFT substrate (the bottom in FIG. 2) using the gate electrode 12 as a mask. Furthermore, by doping a dopant, such as phosphorus or arsenic, in low concentration into the poly silicon thin film 20 using the doping stopper 23, a low-concentration source region 20LS and a low-concentration drain region 20LD including these dopants in low concentration are formed in a self-aligned manner in the respective sides of a region in the poly silicon thin film 20 under the doping stopper 23. Dopants are not doped into the region under the doping stopper 23 because the doping stopper 23 functions as a mask. As a result, this region becomes an intrinsic region including virtually no dopant, which functions as a channel region 20CH of the TFT. In the outside of the low-concentration source region 20LS and the low-concentration drain region 20LD, a source region 20S and a drain region 20D are formed by doping the same dopants in higher concentration.

An interlayer insulating layer 22 of SiNx etc. is formed over the poly silicon thin film 20 in which each region (20CH, 20LS, 20LD, 20S, and 20D) is formed, and over the doping stopper 23. A source electrode 16, a drain electrode 18, and drain electrode wiring 18L uniting with the drain electrode 18, of Al, Mo, etc., are formed on the interlayer insulating layer 22. The source electrode 16 and the drain electrode 18 are connected to the source region 20S and the drain region 20D formed in the poly silicon thin film 20, at contact holes made in the interlayer insulating layer 22.

A low-temperature poly silicon TFT in this embodiment comprises the gate electrode 12, the gate insulating layer 14, the poly silicon thin film 20 (20CH, 20LS, 20LD, 20S, and 20D), the source electrode 16, and the drain electrode 18; has as an active layer comprising the poly silicon thin film 20 formed through a low-temperature process; and consists of a TFT of a bottom-gate type in which the gate electrode 12 is located on the bottom of the device. TFT shape is, however, is not limited to the bottom-gate type. A top-gate type in which a gate electrode is located in a layer over a poly silicon thin film may also be used.

Furthermore, a planarizing interlayer insulating layer 24 with a thickness of approximately 1 $\mu$m or more is formed for planarization over the TFT of the above design and the interlayer insulating layer 22, which extends over almost the entire area on the TFT substrate 10. A material, such as SOG (spin on grass), BPSG (boro-phospho-silicate glass), or acrylic resin, is used for the planarizing interlayer insulating layer 24. In a transmission-type display, a pixel electrode 26 of a transparent conductive layer, such as ITO (indium tin oxide), is formed on the planarizing interlayer insulating layer 24, which extends over the TFT-forming area, for driving liquid crystal. The pixel electrode 26 is connected to the source electrode 16 via a contact hole made in the planarizing in.terlayer insulating layer 24. In a reflector-type display, a conductive reflection material, such as Al, is used for the pixel electrode 26.

A vertical alignment layer 28 formed of, for example, polyimide (SiNx) is formed without a rubbing process over the pixel electrode 26 as an alignment layer for aligning liquid crystal molecules in the vertical direction, and extends over almost the entire area on the TFT substrate 10.

The opposite substrate (second substrate) 30 located opposite the TFT substrate 10 (on which each device described above is formed), with the liquid crystal layer 40 being sandwiched between is made from a material such as glass or the like, being the same as that for the TFT substrate 10. An RGB color filter 38 is formed on the surface of the opposite substrate 30 opposite the TFT substrate 10. A common electrode 32 of ITO or the like is formed over the RGB color filter 38 with a protective layer 36 of acrylic resin or such a material between. The common electrode 32 and the pixel electrode 26 located opposite it drive the liquid crystal. In the present invention, as described below, electrode-free portions in the shape of, for example, the letter X shown in FIG. 1 are formed as an alignment controlling window 34 in an area of the common electrode 32 opposite each of the pixel electrodes 26. Furthermore, the vertical alignment layer 28 which is the same as that over the TFT substrate 10 is formed over the common electrode 32 and the alignment controlling window 34.

The liquid crystal layer 40 is injected into a gap between the substrates set, for example, to about 3 μm and is made from a material having dielectric anisotropy, which means that the dielectric constant in the direction of the minor axis of a liquid crystal molecule 42 is greater than that in the direction of the major axis. The liquid crystal layer 40 in this embodiment is made from a material made by mixing in a desired ratio molecules having the structure given by chemical formulas (1)–(6) having fluorine on their side chains, as described above. The material includes molecules given by at least one of the chemical formulas (1)–(6).

Chemical formula (1)

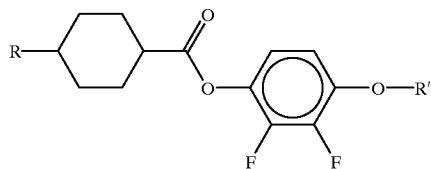

Chemical formula (2)

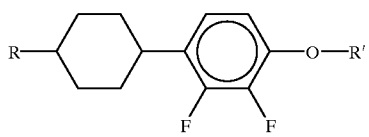

Chemical formula (3)

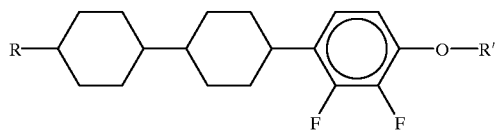

Chemical formula (4)

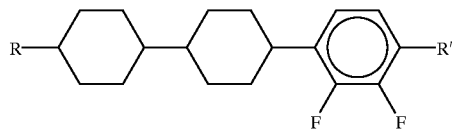

Chemical formula (5)

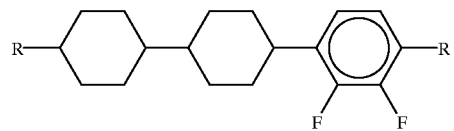

Chemical formula (6)

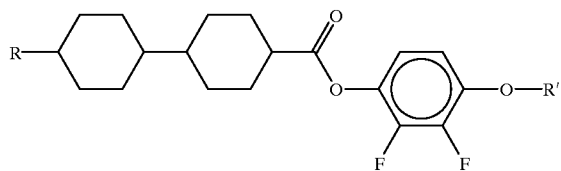

The end groups R and R' in formulas (1)–(6) may be any suitable functional groups typically found in liquid crystals known and commonly used in the art. Today liquid crystal molecules having cyano (CN—) group side chains are commonly used for a liquid crystal material having negative dielectric anisotropy for a TFT liquid crystal display with noncrystal silicon of low mobility as an active layer. However when liquid crystal molecules having cyano (CN—) group side chains are driven at a low voltage, a residual DC voltage is introduced. Therefore, these molecules must be driven at a sufficiently high voltage, resulting in a low voltage-holding ratio and the possibility of the image persistence of the liquid crystal. In the present invention, however, a poly silicon TFT which is made through a low-temperature process and can be driven at a low voltage is used. If a conventional liquid crystal material having cyano (CN—) group side chains is used, the characteristic of a poly silicon TFT that it can be driven at a low voltage therefore cannot be utilized. If liquid crystal molecules having fluorine on their side chains given by the above chemical formulas (1)–(6) are combined as a liquid crystal material, the polarity of side chains will become high and, as a result, the liquid crystal layer 40 can be driven at a low voltage of, for example, about 2 V within a temperature range of from –20° C. to 80° C. or more. The liquid crystal has a sufficiently high voltage-holding ratio even if it is driven at a low voltage by a poly silicon TFT and is prevented from image persistence. Driving a liquid crystal display at a low voltage makes it possible to reduce power consumption to significantly less than a liquid crystal display using a noncrystal silicon TFT.

In this embodiment, DAP (deformation of vertically aligned phase) type alignment control in which the initial alignment of liquid crystal molecules is controlled in the vertical direction is performed by using the above liquid crystal material containing fluorine liquid crystal molecules having negative dielectric anisotropy and the vertical alignment layer 28. DAP is one type of electrically controlled birefringence (ECB) method and controls transmittance of light incident on a liquid crystal layer using the difference between refractive indexes, or a birefringence phenomenon, in the directions of the major axis and the minor axis of the liquid crystal molecules.

When a voltage is applied to the liquid crystal layer 40, a DAP liquid crystal display can change linearly-polarized incident light having gone through one of the polarizing plates 44 and 46 arranged perpendicularly to each other outside of the TFT substrate 10 and the opposite substrate 30 into elliptically polarized light and into circularly polarized light by using its birefringence, and then emit the incident light from the other polarizing plate. When a voltage is not applied to the liquid crystal layer 40, liquid crystal molecules are aligned in the vertical direction by the vertical alignment layer 28. Birefringence therefore does not occur to light incident on the liquid crystal layer 40 from one of the polarizing plates, and the incident light is therefore not emitted from the other polarizing plate. That is to say, DAP type performs what is known as normally black mode display in which the amount of birefringence, or the phase difference (amount of retardation) between the ordinary light and extraordinary light components of lincarly-polarized incident light, depends upon electric field strength in the liquid crystal layer 40 and in which the display changes from black to white with the increase of voltage applied to the liquid crystal layer 40. By controlling voltage applied to the liquid crystal layer 40 for each pixel, the amount of light emitted from the other polarizing plate, or transmittance, is controlled for each pixel, thereby enabling use of the entire display for displaying a desired image.

Furthermore, in the present invention, the alignment controlling window 34, an electrode-free portion, is formed in the common electrode 32 as shown in FIGS. 1 and 2. Liquid crystal molecules are tilted in predetermined directions with the alignment controlling window 34 as a center, resulting in better responsibility of liquid crystal molecules. In addition, by making liquid crystal molecules in a pixel have different alignment azimuths, dependence of liquid crystal display on viewing angle can be reduced and a display with a wide viewing angle can be obtained. When voltage being applied to the liquid crystal layer 40, oblique electric fields in different directions occur between an edge part on each side of the pixel electrode 26 shown in FIG. 1 and the common electrode 32, as shown by the dotted lines in FIG. 2, so that liquid crystal molecules at the edges of the pixel electrode 26 tilt from the vertical alignment to the side opposite to the tilt of the oblique electric field. The liquid crystal molecules 42 have the property of continuum. If the tilt azimuth of liquid crystal molecules at the edge parts of the pixel electrode 26 is determined (tilt angle depend upon electric field strength) by oblique electric fields, the tilt azimuth of liquid crystal molecules near the center of the pixel electrode 26 follows that of liquid crystal molecules at each side of the pixel electrode 26, resulting in more than one area in one pixel area having different tilt azimuths. of liquid crystal molecules.

Voltage being applied to the alignment controlling window 34 is always lower than a threshold for operating liquid crystal so that liquid crystal molecules at the alignment controlling window 34 are kept vertically aligned as shown in FIG. 2. Therefore, the alignment controlling window 34 is always the border between areas having different tilt azimuths of liquid crystal molecules. For example, if the alignment controlling window 34 has the shape of the letter X as shown in FIG. 1, the borders between areas A, B, C, and D having different tilt azimuths are also fixed on the alignment controlling window 34 in the shape of the letter X.

As stated above, transmittance depends upon the tilt of liquid crystal molecules to incident light with a DAP type liquid crystal display. If there is one tilt azimuth of liquid crystal molecules in one pixel area, the direction of a priority viewing angle is therefore limited to the corresponding tilt azimuth, resulting in great dependence on viewing angle. If there is more than one area having different tilt azimuths in one pixel area and the borders between these areas vary with the selected period, a rough image will be displayed, leading to degradation in display quality. In this embodiment, in addition to the division of alignment in one pixel area, the borders between more than one area having different tilt azimuths of liquid crystal molecules can be fixed on the alignment c controlling window 34 while providing more than one priority viewing angle (in this description, four angles: top, bottom, right, and left), resulting in a liquid crystal display with a wide viewing angle.

Furthermore, in the present invention the pixel electrode 26 is formed so that the interlayer insulating layers 22 and 24 are located over the areas comprising the TFT and its electrode wiring (gate electrode wiring and drain electrode wiring), etc., as defined above. Leakage of electric fields generated by the TFT and its electrode wiring into the liquid crystal layer 40 is thereby prevented, as are the resulting effects on the alignment of liquid crystal molecules. In this way as well, the planarizing interlayer insulating layer 24 can improve the planarity of the surface of the pixel electrode 26, and can prevent the disarrangement of the alignment of liquid crystal molecules caused by the irregularities of the surface of the pixel electrode 26. That is to say, this embodiment employs a configuration in which leakage of electric fields generated by the TFT and its electrode wiring, the irregularities of the surface of the pixel electrode 26, etc. can be reduced, as stated above. The alignment of liquid crystal molecules is controlled by a function of electric fields at the edge portions of the pixel electrode 26 and the alignment controlling window 34 and therefore there is no need to perform a rubbing process of the vertical alignment layer 28.

As stated above, a poly silicon TFT which can form its channel, source, and drain by self-alignment is used as a switching device in a display area, and a driver consisting of poly CMOS structure silicon TFTs made through a process almost identical to that of a TFT in the liquid crystal display part is formed around the liquid crystal display part. By eliminating a rubbing process having the possibility of having a bad effect on poly silicon TFTs in the driver part where TFTs are dense as in this embodiment, the yield of a liquid crystal display can be improved.

When the pixel electrode 26 is formed over a TFT and its electrode wiring to create, for example, a reflector-type liquid crystal display, a very high aperture ratio can be obtained. In conventional displays this aperture ratio is limited by factors such as the TFT, wiring and alignment margin, but with a transmission-type liquid crystal display, an aperture ratio can be made as high as possible by forming the transparent pixel electrode 26 over a TFT and its electrode wiring, in an upper layer, in an area partitioned from the TFT and its electrode wiring.

Furthermore, by locating the pixel electrode 26 in a layer above a TFT and its electrode wiring, the distance between the pixel electrode 26 and the liquid crystal layer 40 is shortened, so that it becomes possible to efficiently apply a driving voltage from the pixel electrode 26 to the liquid crystal layer 40.

While what has been described is, at present, considered to be a preferred embodiment of the invention, it will be understood that various modifications may be made thereto, and it is intended that the appended claims cover all such modifications falling within the true spirit and scope of the invention.

What is claimed is:

1. An active-matrix liquid crystal display comprising:

a plurality of pixel electrodes on a first substrate and a common electrode formed on a second substrate placed opposite said first substrate;

a plurality of first thin film transistors formed to be connected to said corresponding pixel electrodes;

a liquid crystal layer sandwiched between the plurality of pixel electrodes and the common electrode; wherein initial alignment of liquid crystal molecules in the liquid crystal layer is controlled so as to be substantially perpendicular to the pixel electrodes; and at least one material used in the liquid crystal layer has the molecular structure given by one of the following chemical formulas (1)–(6):

Chemical formula (1)
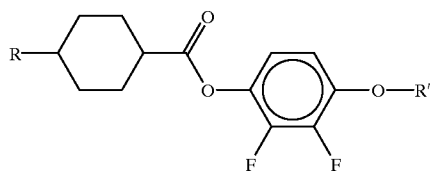

Chemical formula (2)
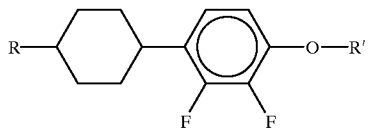

Chemical formula (3)
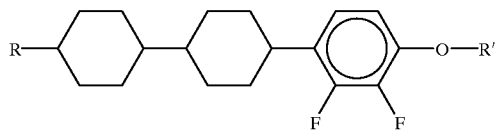

Chemical formula (4)
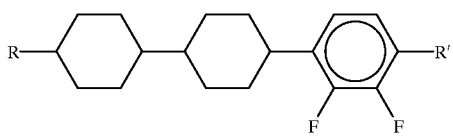

Chemical formula (5)
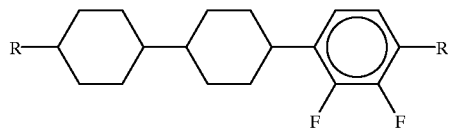

Chemical formula (6)
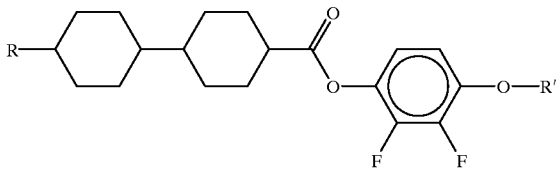

wherein R and R' are suitable functional groups.

2. The active-matrix liquid crystal display according to claim 1, wherein a plurality of electrode-free sections for controlling the alignment of said liquid crystal layer are formed as alignment controlling windows in predetermined areas in said common electrode on said second substrate opposite said corresponding pixel electrodes, and more than one area having different tilt, azimuths is formed in each pixel electrode area by changing the alignment of the liquid crystal molecules from the vertical direction.

3. The active-matrix liquid display according to claim 1, wherein a planarizing interlayer insulating layer is formed over said first thin film transistors and their electrode wiring formed on said first substrate, and wherein said each of said plurality of pixel electrodes are formed on said planarizing interlayer insulating layer.

4. The active-matrix liquid crystal display according to claim 1, wherein a planarizing interlayer insulating layer is formed over said first thin film transistors formed on said first substrate, and wherein said plurality of pixel electrodes are formed on said planarizing interlayer insulating layer at least over an area on which said first thin film transistors are formed.

5. The active-matrix liquid crystal display according to claim 1, wherein a driving circuit comprising a plurality of second thin film transistors is formed on the peripheral part of said first substrate, and the first and second thin film transistors are capable of being formed in the same process.

6. The active-matrix liquid crystal display according to claim 1, wherein each of said first thin film transistors comprises a poly silicon layer formed at a low temperature as its active layer.

7. The active-matrix liquid crystal display according to claim 2, wherein a liquid crystal material used for said liquid crystal layer has a negative dielectric anisotropy, and vertical alignment of said liquid crystal layer is controlled by vertical alignment layers formed over said common electrode and said pixel electrodes without a rubbing process, said alignment controlling windows formed in said common electrode, and voltage applied to each of the plurality of pixel electrodes.

8. The active-matrix liquid crystal display according to claim 2, wherein a planarizing interlayer insulating layer is formed over the first thin film transistors and their electrode wiring formed on said first substrate and wherein each of said plurality of pixel electrodes are formed on said planarizing interlayer insulating layer.

9. The active-matrix liquid crystal display according to claim 2, wherein a driving circuit comprising a plurality of second thin film transistors is formed on the peripheral part of said first substrate, and the first and second thin film transistors are capable of being formed in the same process.

10. The active-matrix liquid crystal display according to claim 7, wherein a driving circuit comprising a plurality of second thin film transistors is formed on the peripheral part of said first substrate, and the first and second thin film transistors are capable of being formed in the same process.

* * * * *